(12) United States Patent
Simard et al.

(10) Patent No.: US 8,491,348 B2
(45) Date of Patent: Jul. 23, 2013

(54) LEVER POSITION SENSOR

(75) Inventors: Richard Simard, St-Charles de Drummond (CA); Francois Giroux, Valcourt (CA); Etienne Girard, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 301 days.

(21) Appl. No.: 12/918,249

(22) PCT Filed: Jun. 30, 2008

(86) PCT No.: PCT/US2008/068795
§ 371 (c)(1), (2), (4) Date: Aug. 18, 2010

(87) PCT Pub. No.: WO2010/002391
PCT Pub. Date: Jan. 7, 2010

(65) Prior Publication Data
US 2011/0035039 A1 Feb. 10, 2011

(51) Int. Cl.
*B63H 11/11* (2006.01)
(52) U.S. Cl.
USPC .............................. 440/41; 440/87
(58) Field of Classification Search
USPC ................. 440/41, 84–86, 87; 338/153, 108
See application file for complete search history.

(56) References Cited

U.S. PATENT DOCUMENTS

| | | | |
|---|---|---|---|
| 4,838,113 A | 6/1989 | Matsushima et al. | |
| 5,416,295 A * | 5/1995 | White et al. | 200/86.5 |
| 6,023,995 A | 2/2000 | Riggle | |
| 6,147,590 A * | 11/2000 | Mikolcic | 333/153 |
| 6,350,163 B1 | 2/2002 | Fujimoto | |
| 6,551,153 B1 | 4/2003 | Hattori | |
| 6,666,106 B1 | 12/2003 | Hueges et al. | |
| 6,699,085 B2 | 3/2004 | Hattori | |
| 6,826,979 B2 * | 12/2004 | Dybro | 74/527 |
| 6,948,990 B2 * | 9/2005 | Hattori | 440/88 A |
| 7,647,143 B2 * | 1/2010 | Ito et al. | 701/21 |

FOREIGN PATENT DOCUMENTS

JP 01212625 A 8/1989

OTHER PUBLICATIONS

English Abstract of JP01212625; Published Aug. 25, 1989.
International Search Report of PCT/US2008/068795; Apr. 2, 2009; Helmut Wagner.

* cited by examiner

*Primary Examiner* — Edwin Swinehart
(74) *Attorney, Agent, or Firm* — BCF LLP

(57) ABSTRACT

A lever position sensor assembly (90) has a main housing (92), a lever (48) pivotally connected to the housing about a first axis (100), and a lever position sensor (84). The lever has at least a portion thereof extending outside the housing. The lever position sensor has a fixed portion (120) and a pivoting portion (122). The fixed portion is connected to the housing. The pivoting portion is pivotally connected to the fixed portion about a second axis (124). The second axis is generally parallel to the first axis. The second axis is spaced from the first axis. The lever is operatively connected to the pivoting portion of the lever position sensor such that pivoting the lever about the first axis pivots the pivoting portion of the lever position sensor about the second axis. A vehicle having a lever position sensor assembly is also disclosed.

18 Claims, 6 Drawing Sheets

LEVER POSITION SENSOR

FIELD OF THE INVENTION

The present invention relates to a lever position sensor for a vehicle. More specifically, the present invention relates to a lever position sensor for sensing the position of a lever disposed on a handle of a vehicle.

BACKGROUND OF THE INVENTION

Most recreational vehicles, such as all-terrain vehicles (ATVs), snowmobiles, and personal watercraft, are powered by an internal combustion engine. The operation of the engine generally is controlled by adjusting the quantity of air and fuel the combustion chambers of the engine receive, and by controlling the timing of the ignition of the air/fuel mixture in the combustion chamber. In the case of fuel injected engines, the timing of the injection of the fuel can also be controlled.

Recreational vehicles typically have one or more throttle valves in the engine's air intake system which are mechanically connected to a driver operated throttle operator, generally by a control cable. The throttle operator, generally in the form of a lever or a twist grip on a handlebar of the vehicle, is used by the driver to open and close the throttle valves to adjust the quantity of air going to the combustion chambers of the engine. An electronic control unit (ECU) located in the vehicle then controls the engine's ignition system, and in the case of a fuel injected engine, the engine's fuel injection system, accordingly. In order to have the engine generate more power, the driver uses the throttle operator to cause the throttle valve to open further. Similarly, in order to have the engine generate less power, the driver uses the throttle operator to cause the throttle valve to close. For example, in the case of an ATV moving on a level surface, opening the throttle valve results in the ATV accelerating and closing the throttle valve results in the ATV decelerating.

Recent developments in the field of automotive electronics now allow these vehicles to be equipped with what is known as a throttle-by-wire system. In such vehicles, a throttle operator position sensor senses the position of the throttle operator, transmits this position to the ECU, and the ECU sends a signal to a throttle valve actuator, an electric actuator for example, to adjust the degree of opening of the throttle valve based on the position of the throttle operator. This way, the degree of opening of the throttle valve is also a variable, in addition to the ignition and fuel injection, that can be adjusted by the ECU.

Some throttle operator position sensors consist of a fixed portion and a pivoting portion. In some of these sensors, movement of the pivoting portion relative to the fixed portion changes the value of the current or voltage passing through the sensor. In other sensors, movement of the pivoting portion relative to the fixed portion changes the value of a magnetic field generated by magnets in the sensor. From the value of the current, the voltage, or the magnetic field, the position of the throttle operator can be determined.

In vehicles where the throttle operator is a throttle lever, the pivoting portion of the throttle operator position sensor and the throttle lever are usually connected to each other so as to pivot about the same axis. U.S. Pat. No. 6,699,085, issued Mar. 2, 2004 shows one such throttle operator position sensor assembly. Although this results in a compact arrangement, because of their coaxial arrangement, forces and moments other than those necessary to pivot the pivoting portion of the throttle operator position sensor are transmitted from the throttle lever to the throttle operator position sensor. These forces and moments can result in premature wear or failure of the throttle operator position sensor. These forces and moments can also change the position of the pivoting portion relative to the fixed portion of the throttle operator position sensor, thus resulting in less accurate readings from the throttle operator position sensor.

Some vehicles are also provided with one or more additional levers on the handlebar. On wheeled vehicles, these levers could be used to actuate the brakes and/or shift gears of a transmission. On personal watercraft, these levers could be used to control a trim of the propulsion system and/or control movement of a reverse gate. Lever position sensors like the throttle operator position sensor mentioned above may be used to sense the position of these levers. As such these sensors would suffer from the same drawbacks.

Therefore, there is a need for a lever position sensor assembly that ameliorates at least some of the inconveniences present in the prior art.

SUMMARY OF THE INVENTION

It is an object of the present invention to provide a lever position sensor assembly having a lever and a lever position sensor that pivot about different axes.

It is another object to provide a vehicle having the above lever position sensor.

In one aspect, the invention provides a lever position sensor assembly having a main housing, a lever pivotally connected to the housing about a first axis, and a lever position sensor. The lever has at least a portion thereof extending outside the housing. The lever position sensor has a fixed portion and a pivoting portion. The fixed portion is connected to the housing. The pivoting portion is pivotally connected to the fixed portion about a second axis. The second axis is generally parallel to the first axis. The second axis is spaced from the first axis. The lever is operatively connected to the pivoting portion of the lever position sensor such that pivoting the lever about the first axis pivots the pivoting portion of the lever position sensor about the second axis.

In an additional aspect, pivoting the lever in one of a clockwise direction and a counter-clockwise direction about the first axis pivots the pivoting portion of the lever position sensor in an other of the clockwise direction and the counter-clockwise direction about the second axis.

In a further aspect, the portion of the lever extending outside the housing is disposed on a first side of the first axis. The lever has an extension disposed on a second side of the first axis opposite the first side. The extension has a slot defined therein. The pivoting portion of the lever position sensor includes an arm having a first end pivotally connected to the fixed portion about the second axis and a second end, and a pin disposed on the second end of the arm. The pin is disposed inside the slot such that the pin slides inside the slot as the lever and the pivoting portion of the lever position sensor pivot.

In an additional aspect, the lever is pivotable between a first position and a second position, and the pivoting portion of the lever position sensor is pivotable between a third position and a fourth position. When the lever is in the first position, the pivoting portion of the lever position sensor is in the third position. When the lever is in the second position the pivoting portion of the lever position sensor is in the fourth position. The lever position sensor assembly also has a first spring connected to the lever. The first spring biases the lever towards the first position and the pivoting portion of the lever position sensor towards the third position.

In a further aspect, a second spring is connected to the pivoting portion of the lever position sensor. The second spring biases the lever towards the first position and the pivoting portion of the lever position sensor towards the third position.

In an additional aspect, the first spring is a leaf spring.

In a further aspect, the lever is pivotable between a first position and a second position, and the pivoting portion of the lever position sensor is pivotable between a third position and a fourth position. When the lever is in the first position, the pivoting portion of the lever position sensor is in the third position. When the lever is in the second position the pivoting portion of the lever position sensor is in the fourth position. The lever position sensor assembly also has a spring connected to the pivoting portion of the lever position sensor. The spring biases the lever towards the first position and the pivoting portion of the lever position sensor towards the third position.

In an additional aspect, the spring is a torsion spring.

In a further aspect, the lever position sensor is a Hall-effect sensor.

In an additional aspect, a waterproof sensor housing is disposed inside the main housing. The sensor housing houses the lever position sensor.

In a further aspect, the lever position sensor has a connection port for connecting the lever position sensor to an electronic control unit of a vehicle.

In an additional aspect, the lever is operatively connected to the pivoting portion of the lever position sensor such that a portion of the pivoting portion providing the operative connection translates relative to a portion of the lever providing the operative connection as the lever and the pivoting portion pivot.

In another aspect, the invention provides a vehicle having a vehicle body, a straddle seat associated with the vehicle body, a handlebar disposed forwardly of the straddle seat for steering the vehicle, an engine associated with the vehicle body for powering the vehicle, an electronic control unit (ECU) on the vehicle for controlling an operation of the engine, a throttle body in fluid communication with the engine, a throttle valve disposed in the throttle body for controlling an amount of air supplied to the engine, a lever pivotally connected to the handlebar about a first axis; and a lever position sensor for sensing a position of the lever. The lever position sensor is in electronic communication with the ECU for sending a signal representative of a lever position to the ECU. The lever position sensor has a fixed portion and a pivoting portion. The fixed portion is connected to the handlebar. The pivoting portion is pivotally connected relative to the fixed portion about a second axis. The second axis is generally parallel to the first axis. The second axis is spaced from the first axis. The lever is operatively connected to the pivoting portion of the lever position sensor such that pivoting the lever about the first axis pivots the pivoting portion of the lever position sensor about the second axis.

In an additional aspect, a throttle valve actuator is operatively connected to the throttle valve and is in electronic communication with the ECU. The lever is a throttle lever. The ECU sends a control signal to the throttle valve actuator based on the signal representative of the lever position. The throttle valve actuator adjusts a degree of opening of the throttle valve in response to the control signal.

In a further aspect, pivoting the lever in one of a clockwise direction and a counter-clockwise direction about the first axis pivots the pivoting portion of the lever position sensor in an other of the clockwise direction and the counter-clockwise direction about the second axis.

In an additional aspect, a main housing is connected to the handlebar. The lever is pivotally connected to the housing about the first axis. The lever has at least a portion thereof extending outside the housing. The fixed portion of the lever position sensor is connected to the housing.

In a further aspect, the portion of the lever extending outside the housing is disposed on a first side of the first axis. The lever has an extension disposed on a second side of the first axis opposite the first side. The extension has a slot defined therein. The pivoting portion of the lever position sensor includes an arm having a first end pivotally connected to the fixed portion about the second axis and a second end, and a pin disposed on the second end of the arm. The pin is disposed inside the slot such that the pin slides inside the slot as the lever and the pivoting portion of the lever position sensor pivot.

In an additional aspect, the lever is pivotable between a first position and a second position, and the pivoting portion of the lever position sensor is pivotable between a third position and a fourth position. When the lever is in the first position, the pivoting portion of the lever position sensor is in the third position. When the lever is in the second position the pivoting portion of the lever position sensor is in the fourth position. The lever position sensor assembly also has a first spring connected to the lever. The first spring biases the lever towards the first position and the pivoting portion of the lever position sensor towards the third position.

In a further aspect, a second spring is connected to the pivoting portion of the lever position sensor. The second spring biases the lever towards the first position and the pivoting portion of the lever position sensor towards the third position.

In an additional aspect, the lever is pivotable between a first position and a second position, and the pivoting portion of the lever position sensor is pivotable between a third position and a fourth position. When the lever is in the first position, the pivoting portion of the lever position sensor is in the third position. When the lever is in the second position the pivoting portion of the lever position sensor is in the fourth position. The lever position sensor assembly also has a spring connected to the pivoting portion of the lever position sensor. The spring biases the lever towards the first position and the pivoting portion of the lever position sensor towards the third position.

In a further aspect, the vehicle body includes a hull and a deck disposed on the hull. The vehicle also has a jet pump connected to the hull, a reverse gate operatively connected to the hull, and a reverse gate actuator operatively connected to the reverse gate and in electronic communication with the ECU. The lever is a reverse lever. The ECU sends a control signal to the reverse gate actuator based on the signal representative of the lever position. The reverse gate actuator moves the reverse gate in response to the control signal.

Embodiments of the present invention each have at least one of the above-mentioned objects and/or aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENT

The present invention will be described with respect to a personal watercraft, but it should be understood that other vehicles having a throttle lever, such as snowmobiles, ATVs, motorcycle, and three-wheeled vehicles, are also contemplated. U.S. Pat. No. 7,315,779, issued Jan. 1, 2008, the entirety of which is incorporated herein by reference, describes a snowmobile and an ATV to which the present invention could be applied. U.S. Pat. No. 7,237,637, issued Jul. 3, 2007, the entirety of which is incorporated herein by reference, describes a three-wheeled vehicle to which the present invention could be applied.

Figure 1:
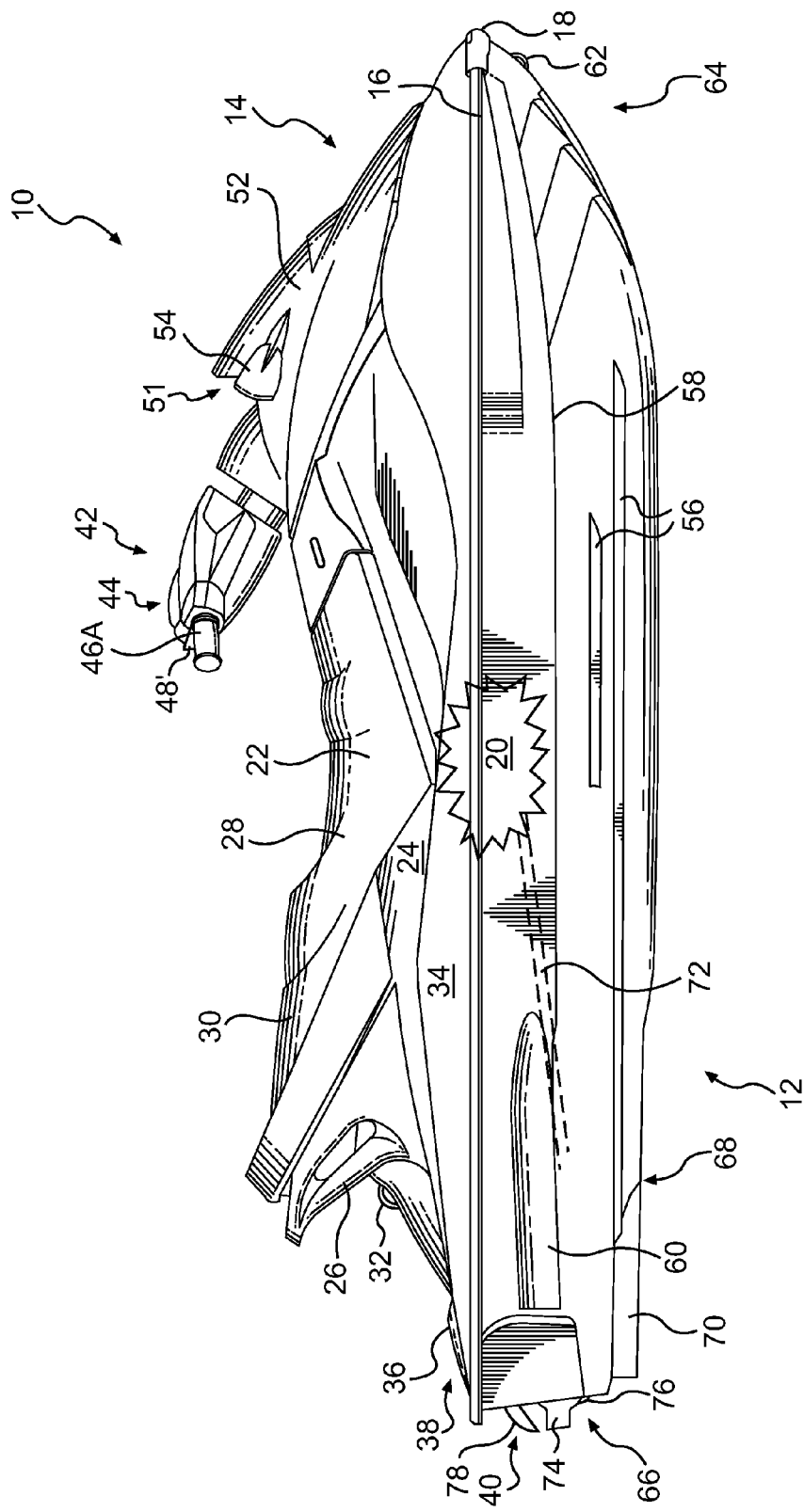
FIG. 1 is a right side elevation view of a personal watercraft.

Turning now to FIG. 1, a personal watercraft 10 has a vehicle body made of two main parts. These parts of the watercraft 10 are the hull 12 and the deck 14. The hull 12 buoyantly supports the watercraft 10 in the water. The deck 14 is designed to accommodate a rider and one or more passengers. The hull 12 and deck 14 are joined together at the bond line 16 by an adhesive. Rivets or other fasteners may also join the hull 12 and deck 14. A bumper 18 generally covers the bond line 16 helping to prevent damage to the outer surface of the watercraft 10 when the watercraft 10 is docked. The volume created between the hull 12 and the deck 14 is known as the engine compartment (not shown). The engine compartment accommodates the engine 20 (schematically illustrated in FIG. 1) as well as the exhaust system, gas tank, electrical system (battery, electronic control unit . . . ), air box, storage bins (not shown) and other elements required or desired for the watercraft 10.

As seen in FIG. 1, the deck 14 has a centrally positioned straddle-type seat 22 placed on top of a pedestal 24 to accommodate a rider in a straddling position. A grab handle 26 is provided between the pedestal 24 and the straddle-type seat 22 at the rear of the straddle-type seat 22 to provide a handle onto which a passenger may hold on. The straddle-type seat 22 may comprise a first and second seats 28 and 30 respectively. First and second seats 28, 30 are preferably removably attached to the pedestal 24 by a hook and tongue assembly (not shown) at the front of each seat 28, and by a latch assembly (not shown) at the rear of each seat 28, 30, or by any other known attachment mechanism. One of the seats 28, 30 covers an engine access opening (not shown), defined by a top portion of the pedestal 24, which provides access to the engine 20, and the other of the seats 28, 30 covers a removable storage box (not shown). A glove box may also be provided in front of the straddle type seat 22. A tow hook 32 is also placed on a rear portion of the pedestal 24 to allow watercraft 10 to tow, for example, a water-skier or an inflatable water toy.

The watercraft 10 has a pair of generally upwardly extending walls located on either side of the watercraft 10 known as gunwales or gunnels 34. The gunnels 34 help to prevent the entry of water in the watercraft 10, provide lateral support for the rider's feet, and also provide buoyancy when turning the watercraft 10, since personal watercraft roll slightly when turning. Towards the rear of the watercraft 10 the gunnels 34 extend inwardly to act as heel rests 36. Heel rests 36 allow a passenger riding the watercraft 10 facing towards the rear, to spot a water-skier for example, to place his heels on the heel rests 36, thereby providing him with a more stable riding position. It should be noted that heel rests 36 could also be separate from the gunnels 34.

Located on either side of the pedestal 24, between the pedestal 24 and the gunnels 34 are a pair of footrests (not shown). The footrests are designed to accommodate a rider's feet in various riding positions. To this effect the forward portions of the footrests are angled upwardly. The remaining portions of the footrests are generally horizontal. The footrests may be covered by carpeting made of a rubber-type material to provide additional comfort and feet traction for the rider. A reboarding platform 38 is provided at the rear of the watercraft 10 to allow the rider or a passenger to easily reboard the watercraft 10 from the water. Carpeting may also cover the reboarding platform 38. A retractable ladder (not shown) may be affixed to the transom 40 to facilitate boarding the watercraft 10 from the water onto the reboarding platform 38.

Figure 2A:
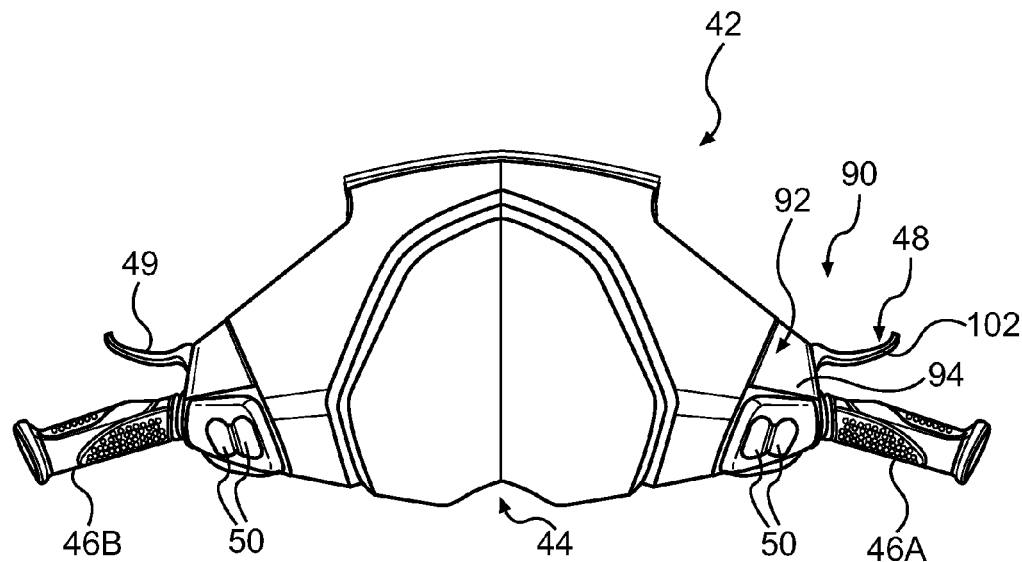
FIG. 2A is a top plan view of a handlebar assembly of the watercraft of FIG. 1.
Figure 2B:
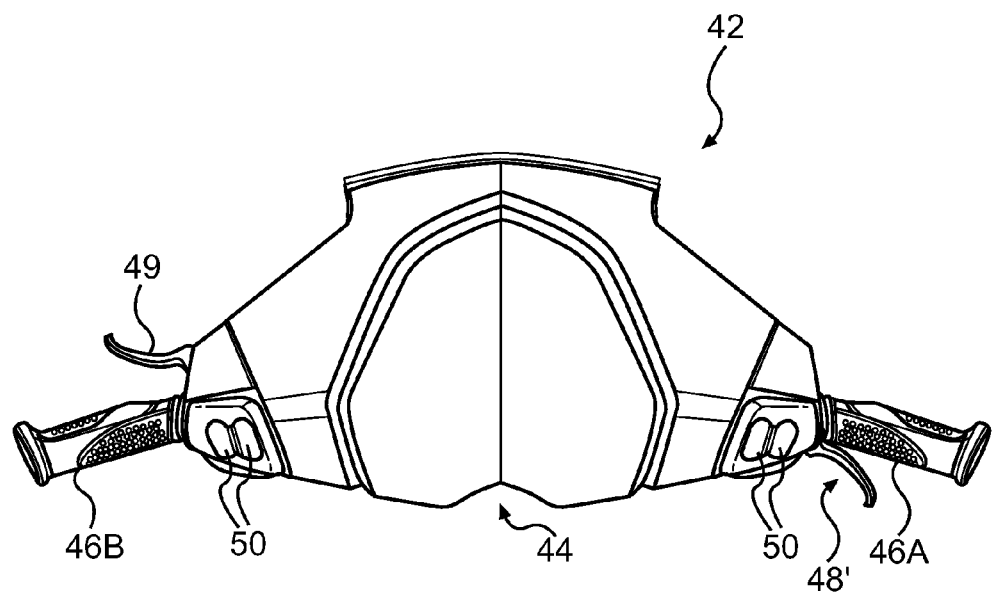
FIG. 2B is a top plan view of an alternative embodiment of the handlebar assembly of the watercraft of FIG. 1.
Figure 3:
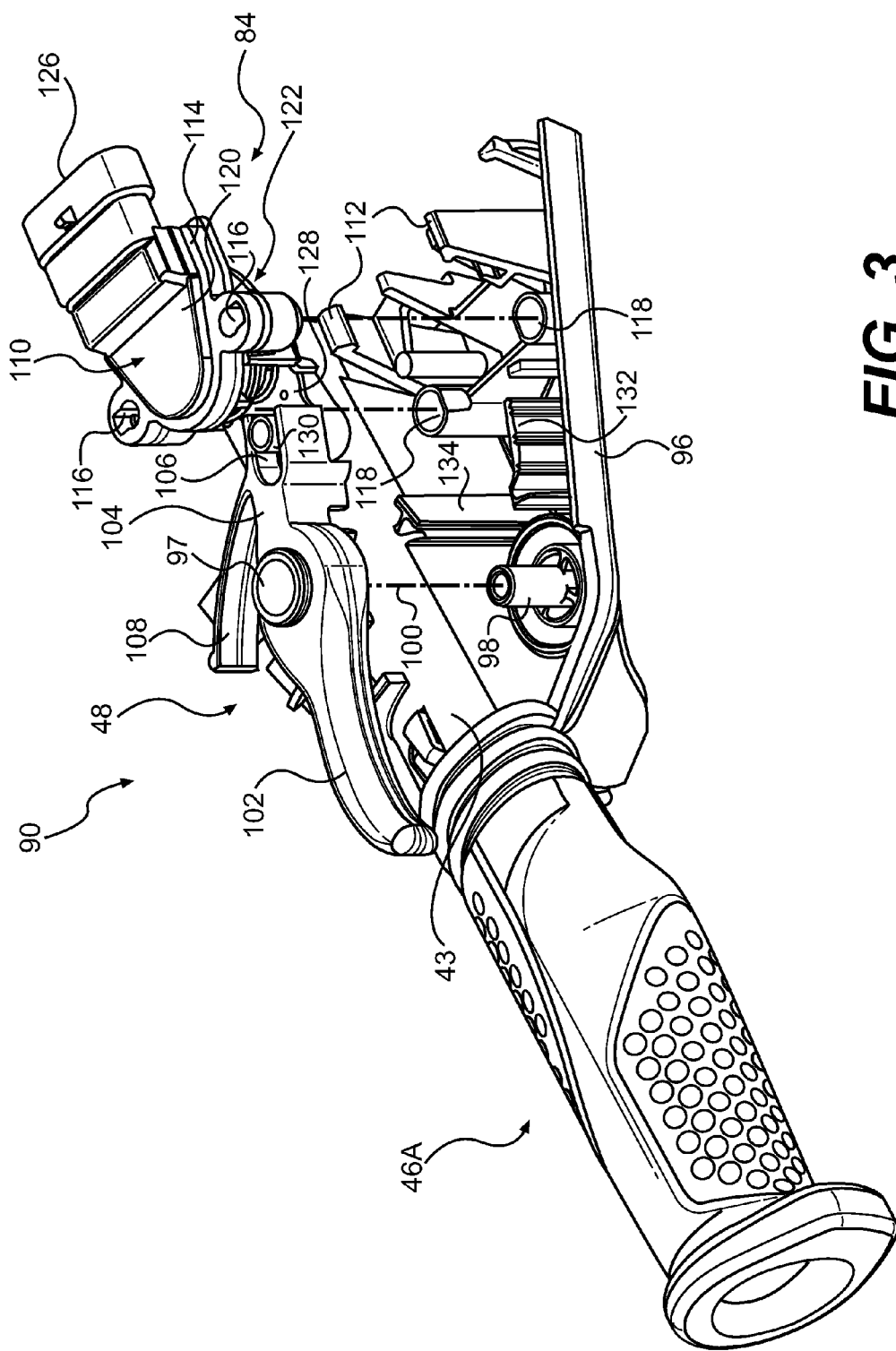
FIG. 3 is a partially exploded, perspective view, taken from a front, right side, of a right handle and a lever position sensor assembly of the handlebar assembly of FIG. 2A, with a top of a throttle lever assembly housing removed.

A handlebar assembly 42 is positioned forwardly of the straddle-type seat 22. As best seen in FIGS. 2A, 2B, and 3, the handlebar assembly 42 has a handlebar, a central portion 44, that may be padded, and a pair of steering handles 46A, 46B disposed at either ends of the handlebar 43. As seen in FIG. 2A, the right steering handle 46A is provided with a throttle operator in the form of a finger-actuated throttle lever 48. Alternatively, as seen in FIGS. 1 and 2B, the right steering handle 46 can be provided with a thumb-actuated throttle lever 48'. The function of the throttle levers 48, 48' will be discussed in greater detail below. The left steering handle 46B is provided with a finger-actuated reverse lever 49. It is contemplated that the finger-actuated reverse lever 49 could be replaced with a thumb-actuated reverse lever. The function of the finger-actuated lever 49 will be discussed in greater detail below. The central portion 44 also has buttons 50 that allow the rider to modify what is displayed (speed, engine rpm, time . . . ) on the display cluster 51 (FIG. 1) located forwardly of the handlebar assembly 42, to change a condition of the watercraft 10 such as trim (the pitch of the watercraft 10), or to engage a watercraft operation mode such as a cruise control mode. The handlebar assembly 42 may also be provided with a key receiving post (not shown), preferably located near a center of the central portion 44. The key receiving post is adapted to receive a key attached to a lanyard so as to allow starting of the watercraft 10. It should be noted that the key receiving post may be placed in any suitable location on the watercraft 10.

As seen in FIG. 1, the watercraft 10 is provided with a hood 52 located forwardly of the handlebar assembly 42. A hinge (not shown) is attached between a forward portion of the hood 52 and the deck 14 to allow the hood 52 to move to an opened position to provide access to a front storage bin (not shown). A latch (not shown) located at a rearward portion of hood 52 locks the hood 52 into a closed position. When in the closed position, the hood 52 prevents water from entering front storage bin. Rearview mirrors 54 are positioned on either sides of the hood 52 to allow the rider to see behind him.

The hull 12 is provided with a combination of strakes 56 and chines 58. A strake 56 is a protruding portion of the hull 12. A chine 58 is the vertex formed where two surfaces of the hull 12 meet. It is this combination of strakes 56 and chines 58 that will give the watercraft 10 its riding and handling characteristics.

Sponsons 60 are located on either sides of the hull 12 near the transom 40. The sponsons 60 have an arcuate undersurface, which give the watercraft 10 both lift while in motion and improved turning characteristics.

A hook 62 is located at the bow 64 of the watercraft 10. The hook 62 is used to attach the watercraft 10 to a dock when it is not in use.

The watercraft 10 is propelled by a jet pump 66. It is contemplated that other types of propulsion system, such as propellers, could be used. The jet pump 66 pressurizes water and accelerates it to create thrust. The water is first scooped from under the hull 12 through an inlet grate 68. The inlet grate 68 prevents large rocks, weeds, and other debris from entering the jet propulsion system 66 since they may damage it or negatively affect its performance. Water then flows through the water intake ramp (not shown). From the intake ramp, water then enters the jet pump 66. The jet pump 66 is located in what is known as the tunnel (not shown). The tunnel is opened towards the rear, is defined at the front, sides, and top by the hull 12, and at the bottom by the ride plate 70. The ride plate 70 is the surface on which the watercraft 10 rides or planes. The jet pump 66 is made of two main parts: the impeller (not shown) and the stator (not shown). The impeller is coupled to the engine 20 by one or more shafts 72, such as a driveshaft and an impeller shaft. The rotation of the impeller pressurizes the water, which then moves over the stator that is made of a plurality of fixed stator blades (not shown). The role of the stator blades is to decrease the rotational motion of the water so that almost all the energy given to the water is used for thrust, as opposed to swirling the water. Once the water leaves the jet pump 66, it goes through the venturi (not shown). Since the venturi's exit diameter is smaller than its entrance diameter, the water is accelerated further, thereby providing more thrust. A steering nozzle 74 is pivotally attached relative to the venturi through a vertical pivot point. The steering nozzle 74 is operatively connected to the handlebar assembly 42 via a push-pull cable (not shown) such that when the handlebar assembly 42 is turned, the steering nozzle 74 pivots and redirects the water coming from the venturi, so as to steer the watercraft 10 in the desired direction. In some watercraft, the steering nozzle 74 may be gimballed to allow it to move around a second horizontal pivot axis. The up and down movement of the steering nozzle 74 provided by this additional pivot axis is known as trim, and controls the pitch of the watercraft 10.

When the watercraft 10 is in movement, its speed is measured by a speed sensor 76 attached to the transom 40 of the watercraft 10. The speed sensor 76 has a paddle wheel which is turned by the flow of water, therefore the faster the watercraft 10 goes, the faster the paddle wheel turns. An electronic control unit (ECU) 77 (FIG. 6) connected to the speed sensor 76 converts the pulse of the rotational speed of the rotational speed of the paddle wheel to the speed of the watercraft 10 in kilometers or miles per hour, depending on the rider's preference. The speed sensor 76 may also be placed in the ride plate 70 or any other suitable position. Other types of speed sensors, such as pitot tube, could also be used. The speed sensor 76 could also be included in a GPS unit, in which case the speed of the watercraft 10 would be determined by calculating the change in position of the watercraft 10 over a period of time based on information obtained from the GPS unit.

Figure 6:
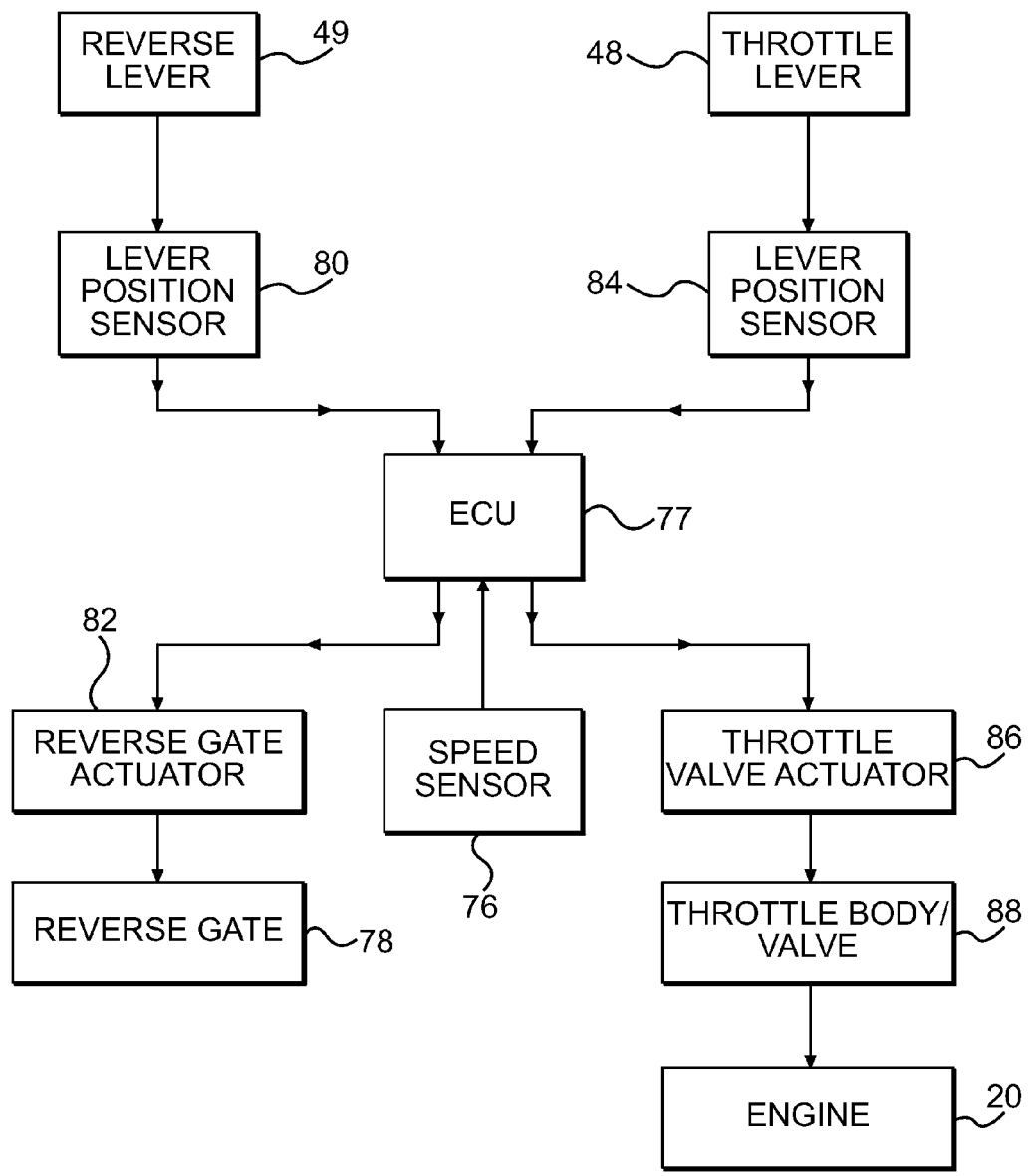
FIG. 6 is a schematic representation of various sensors and actuators provided on the watercraft of FIG. 1.

The watercraft 10 has the ability to move in a reverse direction. To do this a reverse gate 78 is used. The reverse gate 78 is pivotally attached to the sidewalls of the tunnel or directly on the venturi or the steering nozzle 74. To make the watercraft 10 move in a reverse direction, the rider pulls on the reverse lever 49. As seen in FIG. 6, a lever position sensor 80 connected to the reverse lever 49 senses a position of the reverse lever 49 and sends a signal representative of the reverse lever position to the ECU 77. Based on the signal from the lever position sensor 80, the ECU 77 then sends a control signal to a reverse gate actuator 82 that is operatively connected to the reverse gate 78 to pivot the reverse gate 78. The reverse gate actuator 82 is preferably an electric motor, but other types of actuators are contemplated. The reverse gate 78 pivots behind the steering nozzle 74 and redirects the water leaving the jet pump 66 towards the front of the watercraft 10, thereby thrusting the watercraft 10 rearwardly.

It is contemplated that the lever 49 could be used to control other aspects of the watercraft 10, such as trim (in which case it would be a trim lever). In vehicles other than watercraft, the lever 49 could be a brake lever to actuate the brakes of the vehicle or a shift lever to shift gears of a transmission of the vehicle.

Turning to FIG. 6, the function of the throttle lever 48 will be described. It should be understood that the throttle lever 48' has the same function and would operate in a similar way. When a driver of the watercraft 10 pivots the throttle lever 48, a lever position sensor 84 connected to the throttle lever 48 senses a position of the throttle lever 48 and sends a signal representative of the throttle lever position to the ECU 77. The lever position sensor 84 will be described in greater detail below. Based at least on the signal from the lever position sensor, the ECU 77 then sends a control signal to a throttle valve actuator 86 to adjust a degree of opening a throttle valve 88. The throttle valve actuator 86 is preferably an electric motor, but other types of actuators are contemplated. The throttle valve 88 is disposed inside a throttle body that is fluidly connected to one or more combustion chambers of the engine 20. The degree of opening of the throttle valve 88 controls the amount of air being supplied to the combustion chamber(s) of the engine 20.

It is contemplated that the throttle lever 48 or 48' could be provided near the left handle 46B and that the reverse lever 49 could be provided near the right handle 46A.

Turning now to FIGS. 2A, and 3 to 5, a lever position sensor assembly 90 including throttle lever 48 and lever position sensor 84 will be described. The lever position sensor assembly 90 has a main housing 92 disposed between the central portion 44 of the handlebar assembly 42 and the right steering handle 46A. The main housing 92 has an upper housing portion 94 connected on top of a lower housing portion 96 to house the lever position sensor 84 and a portion of the throttle lever 48 therein.

The throttle lever 48 has an aperture 97 disposed around a pin 98 in the lower housing portion 96, thus allowing the throttle lever 48 to pivot about an axis 100 defined by the pin 98. The upper housing portion 94 prevents the throttle lever 48 from being removed from the pin 98. A finger-actuatable portion 102 of the throttle lever 48 extends outside the main housing 92 on a first side of the axis 100. An extension 104 of the throttle lever 48 extends on a second side of the axis 100 inside the main housing 92. The extension 104 has a slot 106 defined therein. The slot 106 is straight, but it is contemplated that it could be curved. A leaf spring 108 is integrally formed with the extension 104. An end of the leaf spring 108 is abutted against the handlebar 43 so as to bias the throttle lever 48 in the position shown in FIG. 4 (the idle position). It is contemplated that the leaf spring 108 could alternatively be abutted against a portion of the main housing 92. It is contemplated that other types of springs, such as torsion or compression springs, could be used. The throttle lever 48 is preferably made as a unitary plastic part. It is contemplated that each part of the throttle lever 48 could be made separately and then connected together and/or that other materials, such as metals, could be used.

The lever position sensor 84 is housed at least in part inside a sensor housing 110. The sensor housing 110 is preferably waterproof to prevent water from damaging electrical and/or electronic components of the lever position sensor 84. The sensor housing 110 is disposed inside the main housing 92 and is connected to the lower housing portion 96 by clips 112 integrally formed in the lower housing portion 96 that engage a lip 114 formed on the periphery of the sensor housing 110. The sensor housing 110 may optionally be connected to the lower housing portion 96 by two fasteners inserted through two apertures 116 in the sensor housing 110 and received in corresponding fastener receiving portions 118 integrally formed in the lower housing portion 96.

The lever position sensor 84 has a fixed portion 120 formed inside the sensor housing 110 and a pivoting portion 122 pivotally connected to the fixed portion 120 about an axis 124. The axis 124 is generally parallel to the axis 100. A connection port 126 formed in the sensor housing 110 is used to connect the lever position sensor 84 to the ECU 77. The lever position sensor 84 is preferably a Hall-effect sensor where a plurality of magnets (not shown) are disposed on the pivoting portion 122 such that the fixed portion 120 senses variations in the magnetic field generated by the magnets as the pivoting portion 122 pivots relative to the fixed portion 120. It is contemplated that other types of sensors operating on different principles could be used, such as a rheostat for example.

The pivoting portion 122 of the lever position sensor 84 has an arm 128 that pivots with the pivoting portion 122 about the axis 124. A cylindrical pin 130 is disposed on the end of the arm 128. The pin 130 is arranged to be disposed inside the slot 106 of the throttle lever 48 such that the pin 130 slides inside the slot 106 when the throttle lever 48 is pivoted, as described below. A torsion spring 131 (FIG. 4) is disposed inside the sensor housing 110 between the fixed portion 120 and the pivoting portion 122 to bias the arm 128, and therefore the pivoting portion 122, towards the position shown in FIG. 4. It is contemplated that other types of springs, such as leaft or compression springs, could be used.

In an alternative embodiment (not shown), the pin 130 is disposed on the extension 104 of the throttle lever 48 and the slot 106 is provided in the arm 128 of the pivoting portion 122 of the lever position sensor 84.

The operation of the lever position sensor assembly 90 will now be described with reference to FIGS. 4 and 5. When a driver of the watercraft 10 pulls on the finger-actuatable portion 102 of the throttle lever 48, the throttle lever 48 pivots clockwise from the position shown in FIG. 4 to the position shown in FIG. 5. A stop 132 integrally formed in the lower housing portion 96 abuts the extension 104 when the throttle lever 48 reaches the position shown in FIG. 5, thus preventing the throttle lever 48 from being rotated further in the clockwise direction. The finger-actuatable portion 102 also abuts the right steering handle 46A when the throttle lever 48 reaches the position shown in FIG. 5, thus also preventing the throttle lever 48 from being rotated further in the clockwise direction. As the throttle lever 48 pivots clockwise, the slot 106 pushes on the pin 130 thereby causing the arm 128, and therefore the pivoting portion 122 of the lever position sensor 84, to pivot counter-clockwise. As the throttle lever 48 pivots, the pin 130 slides inside the slot 106.

Figure 4:
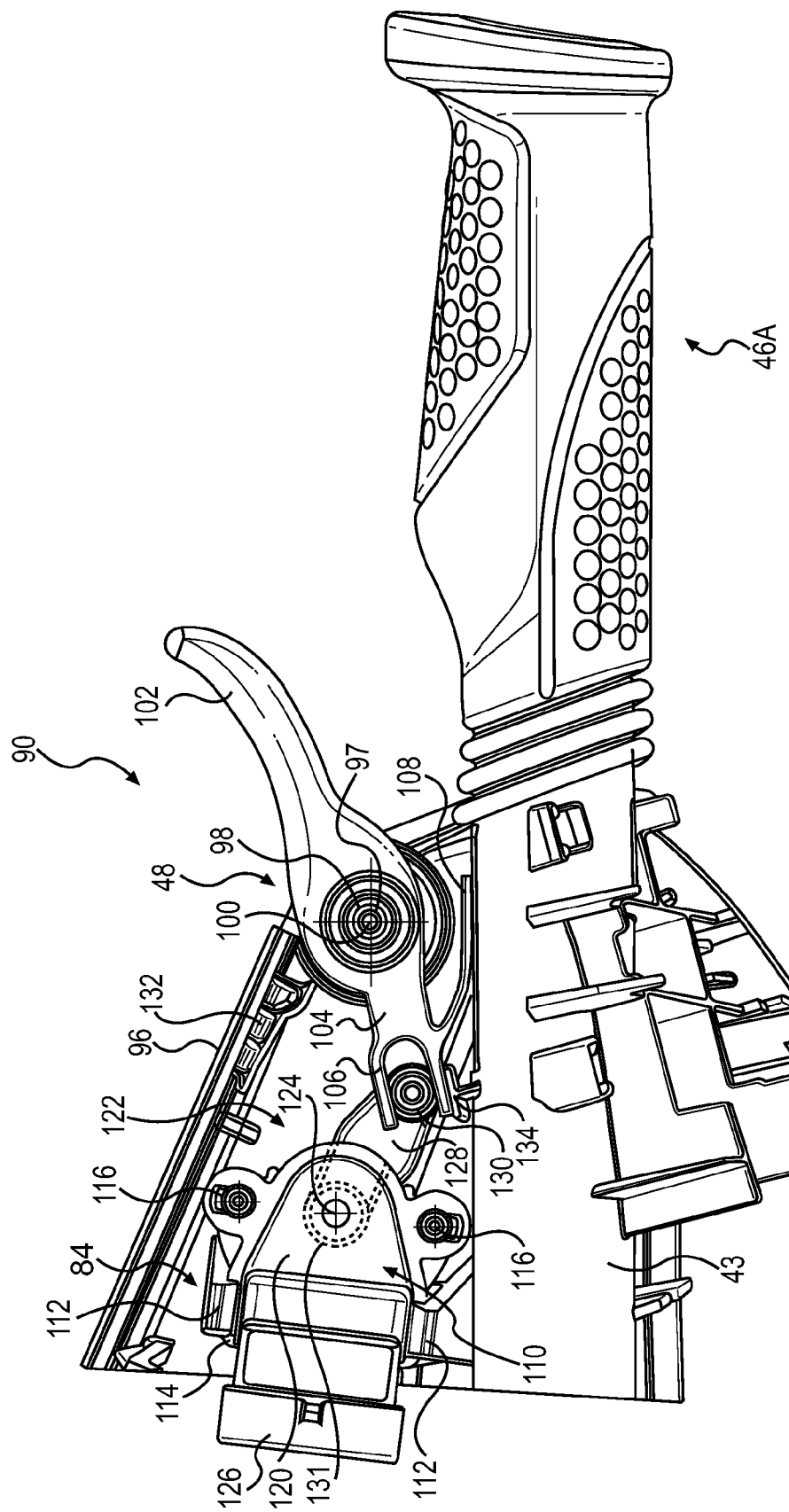
FIG. 4 is a top plan view of the right handle and lever position sensor assembly of FIG. 3, with the throttle lever in an idle position.
Figure 5:
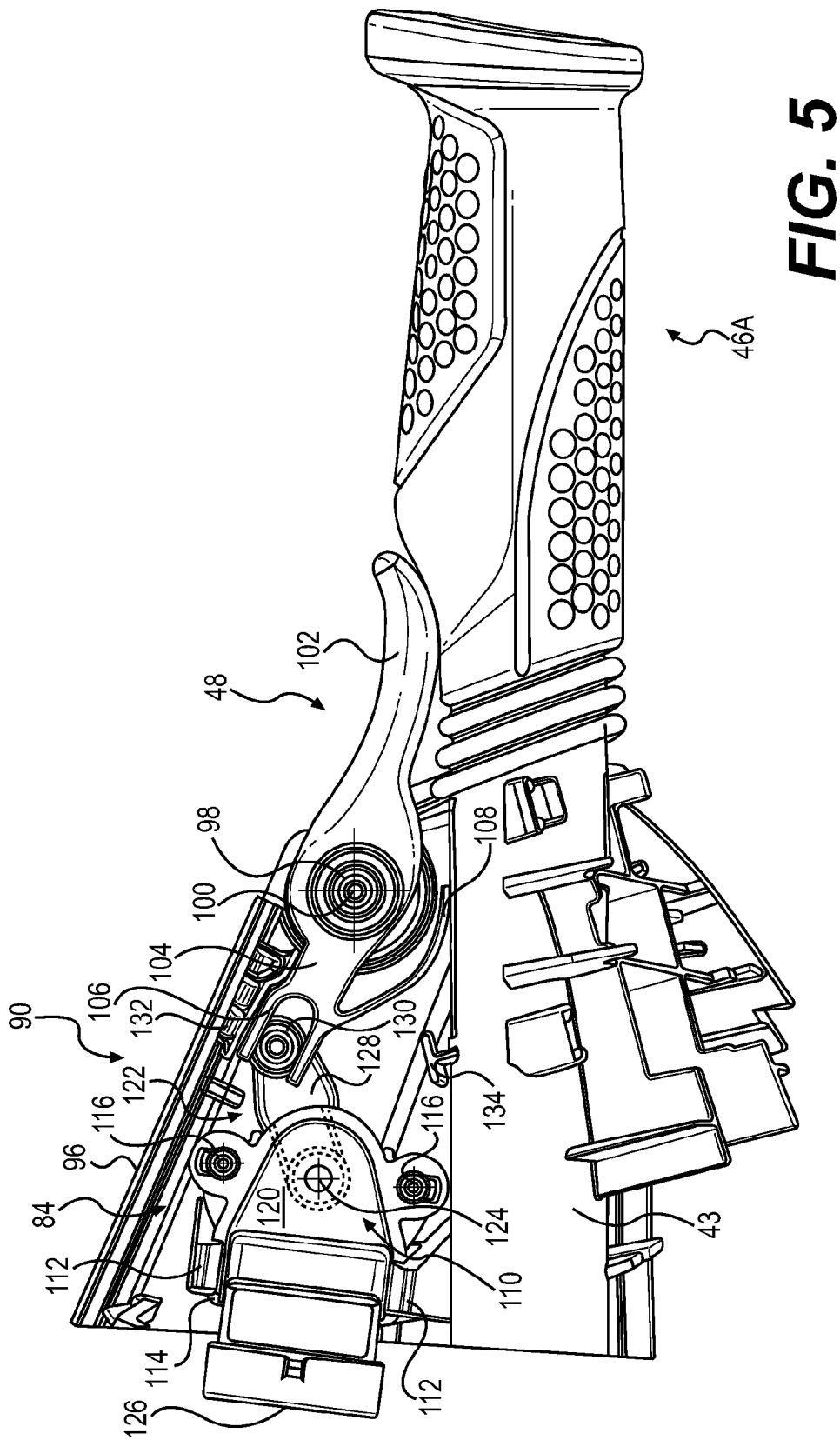
FIG. 5 is a top plan view of the right handle and lever position sensor assembly of FIG. 3, with the throttle lever in full throttle position.

When the driver of the watercraft 10 releases the finger-actuatable portion 102 of the throttle lever 48, the throttle lever 48 pivots counter-clockwise and the arm 128, and therefore the pivoting portion 122 of the lever position sensor 84, pivots clockwise from the positions shown in FIG. 5 to the positions shown in FIG. 4 due to the biasing of the leaf spring 108 and the torsion spring 131. As would be understood, since the slot 106 of the throttle lever 48 engages the pin 130 of the pivoting portion 122, only one of the springs 108, 131 could be provided to bias both the throttle lever 48 and the pivoting portion 122 of the lever position sensor 84 towards the positions shown in FIG. 4. However, by having both springs 108 and 131, the lever position sensor assembly 90 can continue to operate as described should one of the springs 108, 131 fail. A stop 134 integrally formed in the lower housing portion 96 abuts the extension 104 when the throttle lever 48 reaches to position shown in FIG. 4, thus preventing the throttle lever 48 from being rotated further in the counter-clockwise direction.

By having the throttle lever 48 engage the lever position sensor 84 via a sliding pin arrangement (i.e. pin 130 and slot 106) forces being applied to the throttle lever 48 that do not result in the throttle lever 48 pivoting about the axis 100 (such as torsion about axes other than axis 100) are not transferred to the lever position sensor 84, or only a small component thereof. This results in an increased life of the lever position sensor 84 and improves the accuracy of readings from the sensor 84.

Although only two positions for each of the throttle lever 48 and the pivoting portion 122 of the lever position sensor 84 have be shown and described, it should be understood that the driver of the watercraft 10 could pivot the throttle lever 48 to any position intermediate those shown in FIGS. 4 and 5, thus causing the pivoting portion 122 to pivot to a corresponding position.

Since each position of the throttle lever 48 results in a corresponding position of the pivoting portion 122, the ECU 77 can determine the position of the throttle lever based on the signal (resulting from the relative positioning of the pivoting portion 122 with respect to the fixed portion 120) sent by the lever position sensor 84 to the ECU 77 via the connection port 126.

A lever position sensor assembly including the throttle lever 48' would have a similar construction and operate in a similar way as the lever position sensor assembly 90 described above, and as such will not be described herein. The main difference between such a lever position sensor assembly and the lever position assembly 90 is that the directions in which the various components pivot would be opposite to those described above. A lever position sensor assembly including the reverse lever 49 and the lever position sensor 80 would have a similar construction and operate in a similar way as the lever position sensor assembly 90 described above, and as such will not be described herein. The directions in which the various components pivot would be the same or opposite to those described above depending on whether the reverse lever 49 is finger or thumb actuated.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A lever position sensor assembly comprising:
a main housing;
a lever pivotally connected to the housing about a first axis, the lever having at least a portion thereof extending outside the housing, the lever being pivotable between a first position and a second position;
a lever position sensor having a fixed portion and a pivoting portion, the fixed portion being connected to the housing, the pivoting portion being pivotally connected to the fixed portion about a second axis, the pivoting portion being pivotable between a third position and a fourth position, the second axis being generally parallel to the first axis, and the second axis being spaced from the first axis;
a first spring connected to the lever, the first spring being spaced from the pivoting portion of the lever position sensor, the first spring biasing the lever towards the first position and the pivoting portion of the lever position sensor towards the third position; and
a second spring connected to the pivoting portion of the lever position sensor, the second spring being spaced from the lever, the second spring biasing the lever towards the first position and the pivoting portion of the lever position sensor towards the third position,
the lever being operatively connected to the pivoting portion of the lever position sensor such that pivoting the lever about the first axis pivots the pivoting portion of the lever position sensor about the second axis,
the pivoting portion of the lever position sensor being in the third position when the lever is in the first position, and
the pivoting portion of the lever position sensor being in the fourth position when the lever is in the second position.

2. The lever position sensor assembly of claim 1, wherein pivoting the lever in one of a clockwise direction and a counter-clockwise direction about the first axis pivots the pivoting portion of the lever position sensor in an other of the clockwise direction and the counter-clockwise direction about the second axis.

3. The lever position sensor assembly of claim 2, wherein the portion of the lever extending outside the housing is disposed on a first side of the first axis;
wherein the lever has an extension disposed on a second side of the first axis opposite the first side, the extension having a slot defined therein; and
wherein the pivoting portion of the lever position sensor includes:
an arm having a first end pivotally connected to the fixed portion about the second axis and a second end; and
a pin disposed on the second end of the arm, the pin being disposed inside the slot such that the pin slides inside the slot as the lever and the pivoting portion of the lever position sensor pivot.

4. The lever position sensor assembly of claim 1, wherein the first spring is a leaf spring.

5. The lever position sensor assembly of claim 1, wherein the lever position sensor is a Hall-effect sensor.

6. The lever position sensor assembly of claim 1, further comprising a waterproof sensor housing disposed inside the main housing, the sensor housing housing the lever position sensor.

7. The lever position sensor assembly of claim 1, wherein the lever position sensor has a connection port for connecting the lever position sensor to an electronic control unit of a vehicle.

8. The lever position sensor assembly of claim 1, wherein the lever is operatively connected to the pivoting portion of the lever position sensor such that a portion of the pivoting portion providing the operative connection translates relative to a portion of the lever providing the operative connection as the lever and the pivoting portion pivot.

9. The lever position sensor assembly of claim 1, wherein the first spring is in contact with the lever and the second spring is in contact with the pivoting portion of the lever position sensor.

10. The lever position sensor assembly of claim 1, wherein the second spring is connected between the fixed and pivoting portions of the lever position sensor.

11. A vehicle comprising:
a vehicle body;
a straddle seat associated with the vehicle body;
a handlebar disposed forwardly of the straddle seat for steering the vehicle;
an engine associated with the vehicle body for powering the vehicle;
an electronic control unit (ECU) on the vehicle for controlling an operation of the engine;
a throttle body in fluid communication with the engine;
a throttle valve disposed in the throttle body for controlling an amount of air supplied to the engine;
a lever pivotally connected to the handlebar about a first axis, the lever being pivotable between a first position and a second position; and
a lever position sensor for sensing a position of the lever, the lever position sensor being in electronic communication with the ECU for sending a signal representative of a lever position to the ECU,
the lever position sensor having a fixed portion and a pivoting portion, the fixed portion being connected to the handlebar, the pivoting portion being pivotally connected relative to the fixed portion about a second axis, the pivoting portion of the lever position sensor being pivotable between a third position and a fourth position, the second axis being generally parallel to the first axis, and the second axis being spaced from the first axis;
a first spring connected to the lever, the first spring being spaced from the pivoting portion of the lever position sensor, the first spring biasing the lever towards the first position and the pivoting portion of the lever position sensor towards the third position; and
a second spring connected to the pivoting portion of the lever position sensor, the second spring being spaced from the lever, the second spring biasing the lever towards the first position and the pivoting portion of the lever position sensor towards the third position,
the lever being operatively connected to the pivoting portion of the lever position sensor such that pivoting the lever about the first axis pivots the pivoting portion of the lever position sensor about the second axis,
the pivoting portion of the lever position sensor being in the third position when the lever is in the first position, and
the pivoting portion of the lever position sensor being in the fourth position when the lever is in the second position.

12. The vehicle of claim 11, further comprising a throttle valve actuator operatively connected to the throttle valve and in electronic communication with the ECU;
wherein the lever is a throttle lever;
wherein the ECU sends a control signal to the throttle valve actuator based on the signal representative of the lever position; and
wherein the throttle valve actuator adjusts a degree of opening of the throttle valve in response to the control signal.

13. The vehicle of claim 11, wherein pivoting the lever in one of a clockwise direction and a counter-clockwise direction about the first axis pivots the pivoting portion of the lever position sensor in an other of the clockwise direction and the counter-clockwise direction about the second axis.

14. The vehicle of claim 11, further comprising a main housing connected to the handlebar;
   wherein lever is pivotally connected to the housing about the first axis, and the lever has at least a portion thereof extending outside the housing; and
   wherein the fixed portion of the lever position sensor is connected to the housing.

15. The vehicle of claim 14, wherein the portion of the lever extending outside the housing is disposed on a first side of the first axis;
   wherein the lever has an extension disposed on a second side of the first axis opposite the first side, the extension having a slot defined therein; and
   wherein the pivoting portion of the lever position sensor includes:
      an arm having a first end pivotally connected to the fixed portion about the second axis and a second end; and
      a pin disposed on the second end of the arm, the pin being disposed inside the slot such that the pin slides inside the slot as the lever and the pivoting portion of the lever position sensor pivot.

16. The vehicle of claim 11, wherein the vehicle body includes a hull and a deck disposed on the hull;
   the vehicle further comprising:
      a jet pump connected to the hull;
      a reverse gate operatively connected to the hull; and
      a reverse gate actuator operatively connected to the reverse gate and in electronic communication with the ECU;
   wherein the lever is a reverse lever;
   wherein the ECU sends a control signal to the reverse gate actuator based on the signal representative of the lever position; and
   wherein the reverse gate actuator moves the reverse gate in response to the control signal.

17. The vehicle of claim 11, wherein the first spring is in contact with the lever and the second spring is in contact with the pivoting portion of the lever position sensor.

18. The vehicle of claim 11, wherein the second spring is connected between the fixed and pivoting portions of the lever position sensor.

* * * * *